United States Patent [19]

Gordon et al.

[11] 4,204,705
[45] May 27, 1980

[54] ANIMAL TRACK TEACHING

[76] Inventors: William J. J. Gordon; Anthony N. Poze, both of 121 Brattle St., both of Cambridge, Mass. 02138

[21] Appl. No.: 853,453

[22] Filed: Nov. 21, 1977

[51] Int. Cl.$^2$ .................. B42D 15/00; G09F 7/00
[52] U.S. Cl. ........................... 283/1 R; 283/7; 40/616
[58] Field of Search ............... 283/1 R, 1 A, 7; 40/136, 616

[56] References Cited

U.S. PATENT DOCUMENTS

| 233,482 | 10/1880 | De Long | 283/1 A |
| 1,277,645 | 9/1918 | Rothkugel | 283/1 A |
| 2,913,835 | 11/1959 | Montine | 283/1 R X |

OTHER PUBLICATIONS

*Field & Stream* 1971 *Guide to Deer Hunting*, by Warren Page, p. 15.
*Field & Stream New Guide to Bagging Small Game*, "Remington Reports", p. 1.
*Gun World Hunting Guide*, "Basic Old/New Skills for Observing and Matching Wits with Nature", by Allan A. MacFarlan.

*Primary Examiner*—Willie G. Abercrombie
*Attorney, Agent, or Firm*—Charles Hieken

[57] ABSTRACT

Full-scale representations of animal tracks indicating animal activity are located on a sheet. The sheet is placed outdoors in a natural setting where the tracks may be interpreted by an observer.

7 Claims, 1 Drawing Figure

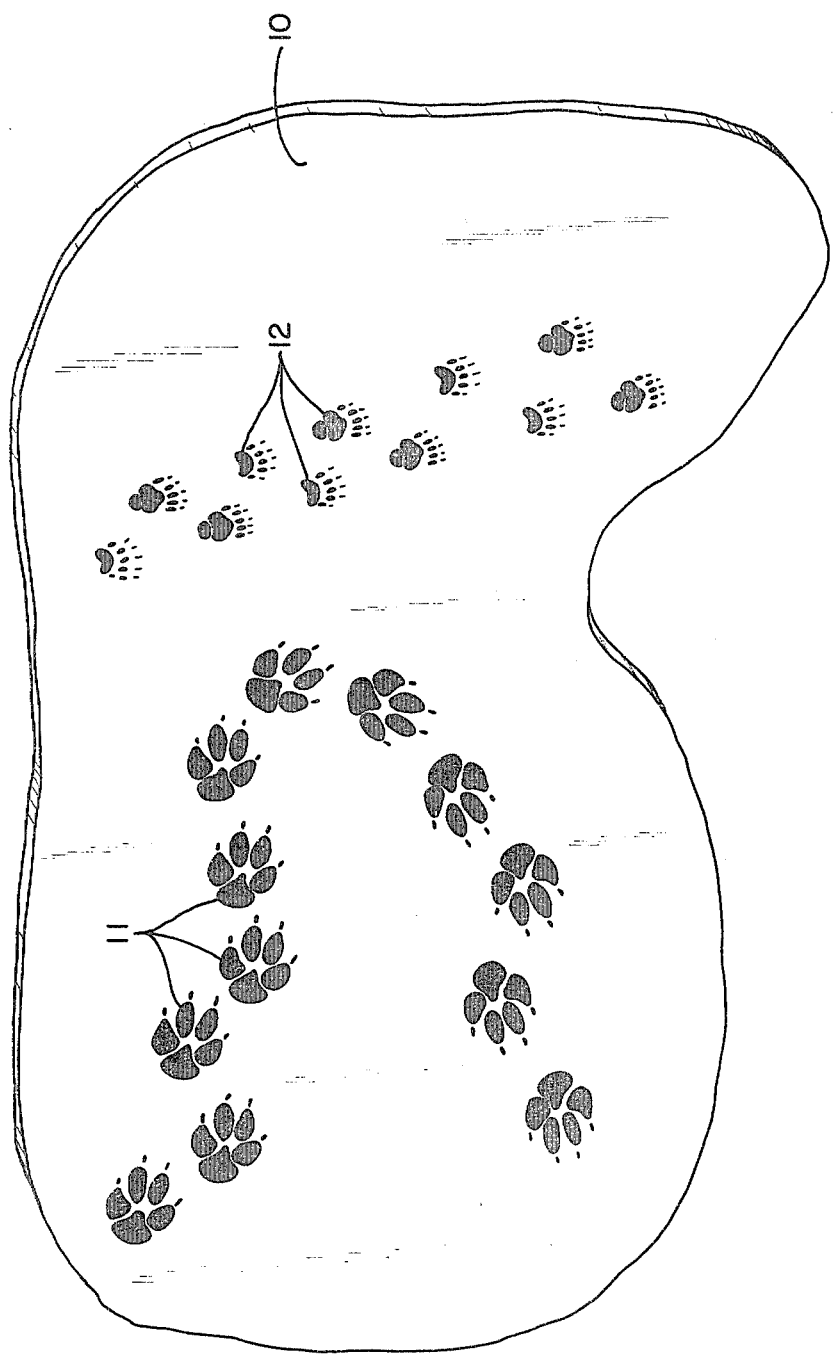

ANIMAL TRACK TEACHING

BACKGROUND OF THE INVENTION

The present invention relates in general to wildlife and nature instruction and demonstration and more particularly concerns novel apparatus and techniques for simulating animal tracks in a natural setting with structure that is relatively easy and economical to fabricate and use.

It is an important object of the invention to provide improved techniques and apparatus for learning about animal activities and behavior.

It is another object of the invention to achieve the preceding object with relatively inexpensive structure easily usable in a natural setting.

SUMMARY OF THE INVENTION

According to the invention an animal track teaching or demonstration unit comprises means defining a surface such as a a sheet with artificially established full-size reproductions of animal tracks selected, oriented and spaced to correspond to tracks made by one or more nonhuman moving animals. In preferred embodiments, the representations are full-scale embossments in the sheet, the sheet is of a durable material suitable for outdoor use and may be colored to conform to a natural setting. The invention includes the method of locating representations of the tracks of wild animals on a sheet suitable for outdoor use and placing the sheet in a natural outdoor setting. Other features, objects and advantages will become apparent from the following specification when read in connection with the accompanying drawing.

BRIEF DESCRIPTION OF THE DRAWING

The single FIGURE of which is a drawing of a preferred embodiment of the teaching unit of the invention.

DETAILED DESCRIPTION OF PREFERRED EMBODIMENTS

With reference now to the drawing there is shown a sheet 10 carrying embossed animal tracks 11 and 12. Since sheet 10 is meant to be used outdoors where it may be left for considerable periods of time, as much as a season or more, it is preferably composed of some suitable durable material, such as plastic or canvas.

Animal tracks 11 are full-scale representations of paws of a fox. Sheet 10 is preferably thick enought to bear realistic impressions. The tracks 11 are not identical, but are selected, oriented and spaced to indicate the passage of a fox.

Tracks 11, so located, are affixed to sheet 10. Movement or disturbance of sheet 10 will not then disturb the relationship between tracks 11 which accurately depicts, in a full-scale representation, the passage of a fox. Alternatively, tracks 11 may be formed in individual sheets of area smaller than that of sheet 10 and affixed to the latter. For example, the prints may be cast in plaster moldings affixed to the sheet and dirt may cover the sheet in the region between moldings to enhance the natural appearance of the tracks.

Animal tracks 12 are similar to tracks 11 in form and function, except that they are representations of the tracks of a skunk, and are located and embossed in sheet 10 to depict, in a full-scale representation, the passage of a skunk.

In this example of a preferred embodiment, one of the more interesting wildlife activities, a confrontation between two animals, is depicted. The representations of tracks 11 and tracks 12 show the unhindered passage of a skunk, and the passage of a fox at about the same time, the fox veering away from the skunk out of respect for the skunk's defenses.

Representations of tracks of other wildlife are of course possible and contemplated by the invention. By tracks are meant paw prints, wing tip impressions, and similar indications made on the ground by nonhuman animals. Sheet 10 is selected to be large enough to provide a field for enough elements so that a comprehensible activity of one or more animals may be depicted.

The colors and composition of the sheet and separate elements, if any, representing tracks are selected to be compatible. Moreover, the color of sheet 10 may be selected to be compatible with a natural setting in which it may be placed. For example, it may be brown if it is to be placed in a summer forest setting, or white if it is to be placed in such a setting as winter. The invention may also be used indoors.

Once such a sheet is selected and appropriate elements representing animal tracks are located on it, a durable teaching unit is formed which may be easily handled and placed without disturbing the accurate representation thereby created. The unit may then be placed in a natural setting where an observer would see, in as natural a way as feasible, indications of animal activity which can be viewed and interpreted.

The unit presents such advantages as keeping the area around the representation of activity free of interfering plant growth. During the winter, the unit, after a snowfall covers it, may be easily shaken free of snow, and immediately put down again. And, of course, the unit may be easily moved or stored without disturbing the representation. Yet, pilferage by the casual thief is inhibited.

In alternative embodiments the elements representing tracks, instead of being embossed or discrete smaller sheets affixed to a larger sheet, could be painted, printed or otherwise imprinted on the sheet. It is evident that those skilled in the art may now make numerous variations and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. An animal track teaching unit comprising, means defining a surface having artificially established full-size reproduction of nonhuman animal tracks of at least two nonhuman animals which reproductions are adapted to be placed in a natural environment selected, oriented and spaced when on said surface to correspond to the tracks made by said at least two nonhuman animals pursuing an interactive activity in said natural environment.

2. The unit of claim 1 in which said reproductions are sheet-like elements bearing representations of animal tracks and said elements are affixed to said surface.

3. The unit of claim 1 in which said surface is comprised of material suitable for outdoor use.

4. The unit of claim 3, said material being colored to conform to an outdoor setting in which the surface may be placed.

5. The unit of claim 1 in which said reproductions are imprinted on said surface.

6. The unit of claim 5 in which said reproductions are embossed on said surface.

7. A method of representing wildlife activity comprising locating full-size reproductions of nonhuman animal tracks representing in full scale the tracks of at least two nonhuman animals on a surface suitable for outdoor use, and placing said surface in a natural outdoor setting so that said full-size reproductions correspond to the tracks made by said at least two nonhuman animals pursuing an interactive activity in said natural outdoor setting.

* * * * *